VARIABLE LENGTH ADDRESS COMPUTER

Filed April 19, 1965 2 Sheets-Sheet 1

INVENTORS
CHARLES E. MACON
ROBERT S. BARTON
PAUL A. QUANTZ
GEORGE T. SHIMABUKURO

Christie, Parker & Hale
ATTORNEYS

VARIABLE LENGTH ADDRESS COMPUTER

INVENTORS
CHARLES E. MACON
ROBERT S. BARTON
PAUL A. QUANTZ
GEORGE T. SHIMABUKURO
Christie, Parker + Hale
ATTORNEYS.

United States Patent Office 3,359,542

Patented Dec. 19, 1967

3,359,542

VARIABLE LENGTH ADDRESS COMPUTER

Charles E. Macon, Altadena, Robert S. Barton, Sierra Madre, Paul A. Quantz, Thousand Oaks, and George T. Shimabukuro, Monterey Park, Calif., assignors to Burroughs Corporation, Detroit, Mich., a corporation of Michigan Filed Apr. 19, 1965, Ser. No. 449,028
4 Claims. (Cl. 340—172.5)

ABSTRACT OF THE DISCLOSURE

A digital computer system having a magnetic core memory and multiple address storage registers. Each address register has a number of different storage positions. A first counter has a state for each position in an address register, a second counter has a state for each of the address registers. The addresses are read from memory and may be either a partial or a complete address composed of one or more characters. Gating is provided for storing each character of an address into the corresponding register as indicated by the second counter and into the particular position indicated by the first counter.

Figure 1:
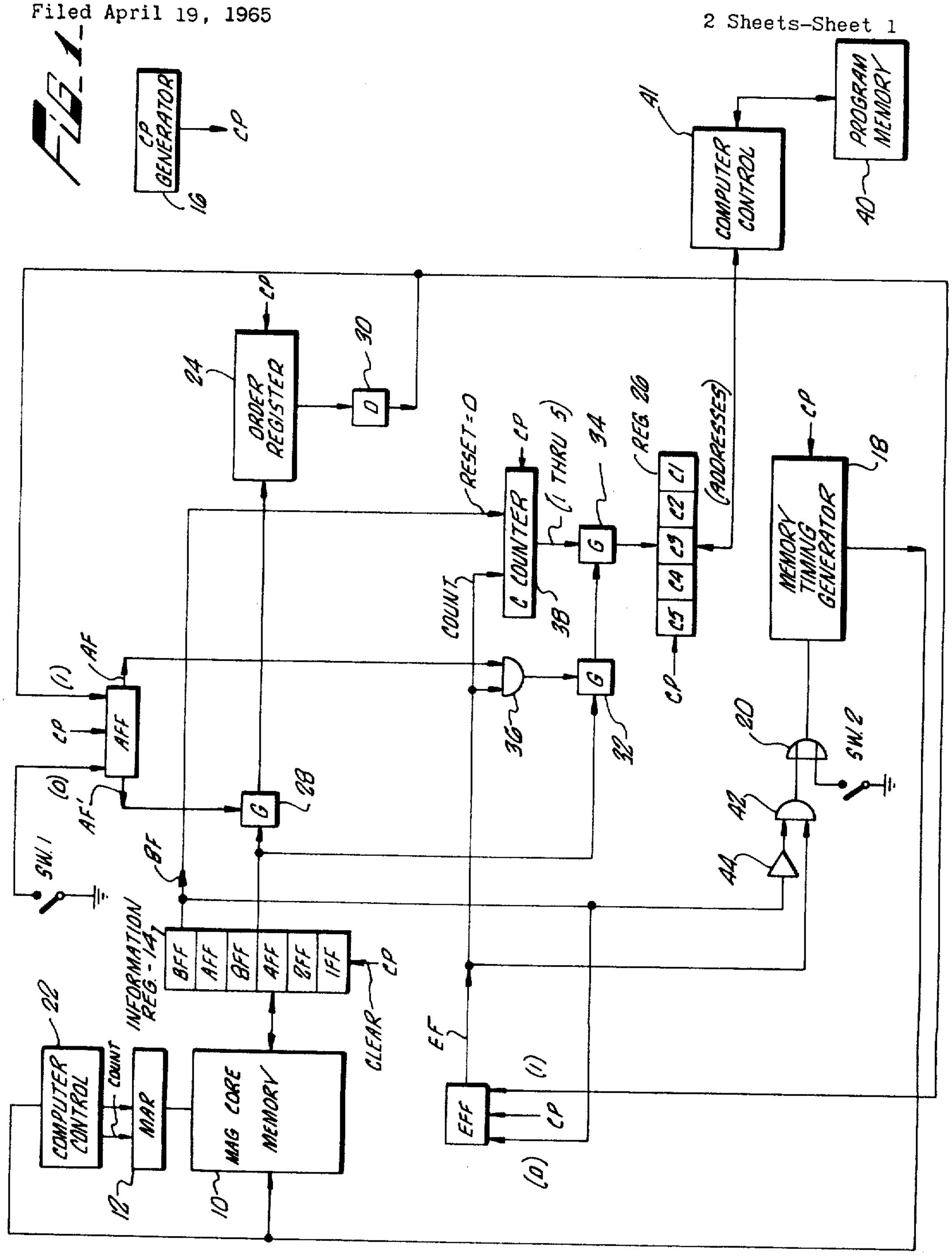

This invention relates to digital computers and more particularly to improvements in addressing apparatus for digital computers.

Digital computers are commonly used with fixed length addresses in each instruction. Each address has a fixed number of bits or characters in the address. It has been found that many times only a part of a complete address changes from one instruction to the next, because the machine is operating in a pre-arranged area of memory. For example, an address having five characters may only have the least significant three characters of the five character address changed from one instruction to the next. Therefore, it is only needed to carry the least significant three characters of the address in an instruction.

The disadvantages of the prior art computers in which a complete address is contained in each instruction becomes very significant in a character oriented computing machine, wherein characters are read out and written into the memory serially. One such disadvantage is that memory access time is consumed in reading a complete address from the memory, whereas, only part of the address need be read from memory. Another advantage is that computing time is used while the program is being stored in the computer for writing complete addresses, whereas, only a portion of a complete address need be written in most instructions. Another disadvantage in both a character oriented computing machine and a word oriented computing machine is, that storage space is used up in the memory for storing a full complement of characters for a complete address in each instruction, whereas, only a part of the complete instruction changes from one instruction to the next.

The present invention eliminates the disadvantages of the prior art by eliminating the time required to read characters which are the same from one instruction to the next and for eliminating the time needed to write the complete address in the instructions. Additionally, the present invention saves memory space by eliminating the need for storing a complete address in an instruction when only a part of the complete address is changed from one instruction to the next.

Briefly, an embodiment of the present invention includes a plurality of registers each having a predetermined number of character storage positions therein arranged in a predetermined order for storing a complete address therein. A memory is provided for storing and reading out addresses at least some of which are partial addresses which are represented by a series of characters. The partial addreses have less chaacters than a complete address. Means is included for providing an indication of the position in a register means into which each different address character is to be stored as each is read from the memory. A gating circuit stores each address character read from the memory into the position of the register indicated by said indicating means. A multiple state means provides a unique signal corresponding to each of the registers as the corresponding address is read from the memory. The gating circuit is additionally coupled to the multiple state means for causing the address characters read from the memory to be stored into the correct register as designated by the multiple state means.

Figure 2:
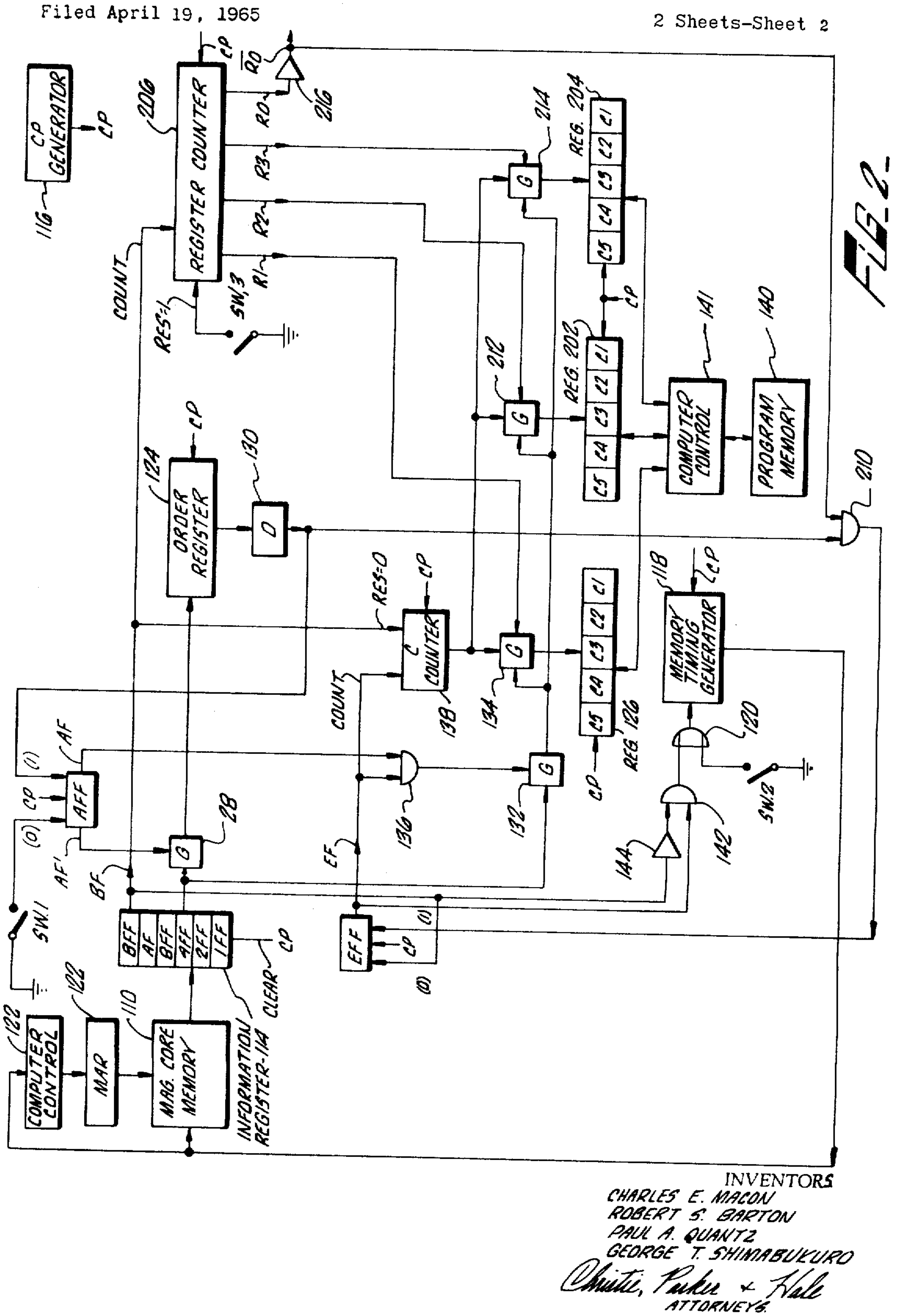

These and other advantages of the present invention can be more fully understood with reference to the following description of the drawings of which:

FIG. 1 is a schematic and block diagram of a portion of a digital computer and embodying the present invention, and FIG. 2 is a schematic and block diagram of a portion of a digital computer showing an alternate embodiment of the present invention.

Before considering the details of the block diagram of FIG. 1, consider the instruction format and the overall function of the system which is shown. Instruction format is such that in the program there is an order which is generally followed by an address. The machine is a single address machine and, therefore, there is one address with each order.

An address register is provided in the system for storing a complete address. The address is composed of characters and, therefore, the register has character storage locations for storing a complete address.

In the invention a modify address order is of particular importance. Also of importance in the invention is the fact that the address associated with the modify address order may be a partial address. A partial address is one which contains less characters than the number of characters in a complete address. Accordingly, in the following discussion it is assumed that the address associated with a modify address order is only a partial address.

The partial address is read from the memory, least significant character first. As each character is read it is stored in the register contained in the complete address. The characters of the partial address replace the corresponding ordered characters in the complete address contained in the register. For example, a units character in an instruction address replaces the units character of the address contained in the register, a tens character in the address of the instruction replaces the tens character of the address contained in the register, etc.

Consider a specific example. If the register contains the complete address characters 54379 and it is desired to change the address to the characters 54298, the partial address in the instruction will only contain the characters 298. The characters 298 will be read out of the memory sequentially and used to replace the characters 379, one by one.

Each character stored in memory is represented by six binary coded bits which are represented by the symbols 1, 2, 4, 8, A, B. The bits 1, 2, 4, 8 are arranged to represent numeric information in binary coded decimal. The use of the "A" bit will not be described as it has no bearing on the present invention. The "B" bit is used to indicate the last character in the partial address in the corresponding instruction.

Consider now the details of the computer system shown in FIG. 1 and which embodies the present invention. The computer system contains a memory 10. The memory 10 is a conventional magnetic core memory which is arranged for reading and writing information a character at a time. However, it should be noted that the invention is not restricted to a magnetic core memory. Associated with the magnetic core memory 10 is a memory address register 12. The memory address register 12 is arranged in a conventional manner well known in the computer art for addressing a storage location, containing one character, in the memory 10.

Also associated with the magnetic core memory 10 is an information register 14. The information register 14 contains six flip-flops represented by the symbols 1FF, 2FF, 4FF, 8FF, AFF, BFF corresponding to the six bits in each character. All characters read out of the memory are stored in the information register 14 before being transferred to other parts of the computer system. The information register 14 has an input connected to the output of a clock pulse generator 16. Each time a clock pulse is applied to the information register 14 it clears out its contents so that all flip-flops are in a "0" state.

Also associated with the magnetic core memory 10 is a memory timing generator 18. Memory timing generator 18 is coupled to an OR gate 20 and is responsive to the coincidence of a control signal from the OR gate 20 and a clock pulse from the generator 16 for causing a read operation in the magnetic core memory 10. The memory address register 12, the magnetic core memory 10, the information register 14 and the memory timing generator 18 form a conventional magnetic core memory system well known in the computer art.

Associated with the memory address register 12 is a computer control 22. The computer control 22 may be arranged in any one of a number of well known ways in the computer art for initially storing an address into the memory address register 12 and also for causing the address contained in the memory address 12 to count up one address each time the memory timing generator 18 causes a read operation in the magnetic core memory 10.

An order register 24 and a register 26 are provided for storing an order and a partial address, respectively, read from the memory 10. A gate 28 is arranged for storing the content of the information register 14 into the order register 24 in response to a control signal from the AF' output of an AFF flip-flop whenever a clock pulse is applied to the order register 24. Under these conditions, an order is stored into the information register 14 and hence transferred to the order register 24.

The AFF flip-flop is a conventional flip-flop circuit having an input for setting it into a "0" state coupled through a switch SW1 to ground potential (0 volts). The AFF flip-flop has its input for setting it into a "1" state coupled to the output of a decoder 30. The flip-flop AFF is set into "0" and "1" states in response to a control signal at the corresponding input circuit in response to a clock pulse from the clock pulse generator 16. The AFF flip-flop forms control signals at its AF and AF' output circuits when in "1" and "0" states, respectively. The decoder 30 is a conventional decoder which monitors the orders stored in the register 24 and forms a control signal at its output whenever an order is stored in the register designating that an address is to be modified.

Gating circuits 32 and 34 are conventional gating circuits for storing a partial address character contained in the information register 14 into one of five character storage positions in the register 26. An AND gate 36 applies a control signal to the gate 32 in response to the coincidence of a control signal at the AF output circuit, from the AFF flip-flop and a control signal at the EF out of an EFF flip-flop. The gate 32 is responsive to the control signal from the AND gate 36 for coupling the content of the information register 14 to the gate 34.

A character counter 38 is provided for counting the characters of a partial address in an instruction read from the memory 10. The character counter 38 has six states referred to as states "0" through "5." The "0" state is the initial state of the counter 38 and the states "1" through "5" defined by the character counter 38 correspond to the character positions C1 through C5, respectively, of the register 26. The gate 34 stores the character coupled thereto by the gate 32 into the character storage position of the register 26 corresponding to the state of the character counter 38.

The character 38 counts from one state to the next in response to a clock pulse in coincidence with a control signal at the EF output of the EFF flip-flop. Additionally, the character counter 38 is reset into a "0" state in response to a control signal from the EF output from the EFF flip-flop in coincidence with a clock pulse. The EFF flip-flop forms a control signal at the EF output circuit when it is in a "1" state which occurs when the last character of a partial address is contained therein.

In a preferred embodiment of the present invention the addresses stored in the register 26 are derived from a program memory 40. The program memory 40 contains a plurality of complete memory instructions for use with the memory 10. The details of the use of the program memory 40 in conjunction with the memory 10 will not be described in detail herein as they are not necessary for a complete understanding of the present invention. Another computer control unit 41 is provided for selectively transferring addresses between the register 26 and the program memory 40, containing the addresses, in a conventional manner in the computer art.

The EFF flip-flop has its input for setting it into a "0" state connected to the BF output of the BFF flip-flop. Also the EFF flip-flop has its input for setting it into a "1" state connected to the output of decoder 30. The EFF flip-flop is set into "0" and "1" states in response to control signals at the corresponding inputs in coincidence with a clock pulse. When the EFF flip-flop is in a "1" and "0" states control signals are formed at the EF and EF' outputs, respectively.

The OR gate 20 has an input connected through a switch SW2 to ground potential and an input connected to an AND gate 42. The AND gate 42 has an input connected to the EF output and an input connected through an inverter 44 to the BF output.

The inverter circuit 44 is a conventional signal inverter circuit for applying a control signal to the AND gate 42 when the BFF flip-flop is in a "0" state and no control signal is applied at the BF output. The AND gate 42 applies a control signal to the OR gate 20 causing the OR gate 20 to apply a control signal to the timing generator 18 whenever the BFF flip-flop is in a "0" state (no control signal is applied at the BF output) and the EFF flip-flop is in a "1" state (causing a control signal at the EF output).

With the details of the computer system of FIG. 1 in mind, consider the operation thereof. Assume that the complete address characters 54379 are contained in the register 26, in character positions C5, C4, C3, C2 and C1, respectively, and that the memory address register 12 now contains the addresses of an order specifying that the address contained in the register 26 is to be modified. Assume that the characters 298 are the characters comprising the partial address following such order. Also assume that the character 2 of the partial address contains a "1" bit in the "B" position indicating that it is the last character of the partial address.

Initially, the operation of the computer system is started by closing the switches SW1 and SW2 causing the AFF flip-flop to be set into a "0" state and causing the memory timing generator 18 to start a read operation in the memory 10. It should be noted that the switches SW1 and SW2 could be mechanical switches but preferably are electronic switches provided as a part of computer control. The memory timing generator 18 causes the order contained in the memory location specified by the memory address register 12 to be read out and stored in the information register 14, and causes the address in the memory address register 12 to be counted up by one address. Thus, the memory address register 12 now points at the first character of the partial address.

With the AFF flip-flop set into a "0" state, the gate 28 causes the order contained in the information register 14 to be stored into the order register 24 at the following clock pulse. The order register 24 now contains the order designating that the address contained in the register 26 is to be modified. Thus, the decoder 30 applies a control signal to the AFF flip-flop and to the EFF flip-flop, therefore, the following clock pulse sets both the AFF and EFF flip-flops into "1" states. With both the AFF and EFF flip-flops in a "1" state, a control signal is applied to both inputs of the gate 36 causing a control signal to the gate 32. Also a control signal is applied to the count input of the character counter 38. At the following clock pulse the memory timing generator 18 causes the first character of the partial address, a character "8," to be read out of the memory and stored into the information register 14 and causes the address contained in the memory address register 12 to be counted up one so that it points at the second character of the partial address. Also the character counter 38 is counted up one state so that it points at the C1 storage position of the register 26.

It should be noted in passing that the clock pulse which causes the timing generator 18 to read the first character of the partial address and which causes the character counter 38 to count up to state "1," does not cause the register 26 to store information, because the character counter 38 was initially pointing at a non-existent storage position, namely "0."

At this point the information register 14 contains the least significant partial address character "8," the AND gate 36 is still applying a control signal to the gate 32 and the character counter 38 is in state "1" and also is receiving a control signal from the EF output. Also the inverter circuit 44 and gates 42 and 20 are applying a control signal to the memory timing generator 18.

Thus, the following clock pulse causes the character "8" stored in the information register 14, to be stored through the gates 32 and 34 into character storage position C1 (which corresponds to state "1" of the character counter 38), causes the character counter 38 to count up to state "2" and causes the memory timing generator 18 to read out the character "9" of the partial address designated by the new state of the memory address register 12. Also the computer control 22 causes the memory address register 12 to count up one address so that its input is pointing at the third character of the partial address.

At this point the computer system is ready to read out the last character of the partial address. At the following clock pulse the character "9" contained in the information register 14 is stored into character position C2 by the gates 32 and 23 as designated by state "2" of the character counter 38. The character "2," whose location is designated by the memory address register 12, is read out from the memory 10 and stored in the information register 14 and the character counter 38 is counted up one state to state "3" so that it points at storage position C3.

At this point, the information register 14 contains the last character of the partial address, a character "2," and a "1" bit is stored in the BFF flip-flop causing a control signal at the BF output. Also the character counter 38 is in state "3" pointing at storage position C3 and the EFF and AFF flip-flops are still in a "1" state. The following clock pulse causes the last character of the partial address, a character "2," to be stored into storage position C3 by the gates 32 and 34, causes the character counter to be reset into a "0" state and causes the EFF flip-flop to be reset to a "0" state. Since a control signal is at the BF output the gates 42 and 20 do not apply a control signal to the memory timing generator 18 and, hence, another memory cycle does not take place.

At this point, the operation of the computer system of FIG. 1 terminates for purposes of modifying the address contained in register 26. The register 26 now contains the address 54298.

Although one embodiment of the present invention has been shown and described in FIG. 1, it should be noted that there are other arrangements of the present invention within the scope of the appended claims. For example, there are other arrangements of the gates 36, 32 and 34 for storing the partial address characters in the appropriate storage positions of the register 26. By way of example, instead of storing the characters in different storage positions in the register 26, each character might be stored in one character position and the content of the register 26 shifted so that each new character is stored in the correct position with respect to the rest of the address contained in the register 26.

Refer now to the computer system shown in FIG. 2 which embodies the present invention. The computer system of FIG. 1 is a single address computer, whereas, the computer system of FIG. 2 is a three address computer. Many of the elements of FIG. 2 are the same as the elements of FIG. 1. These elements have been designated by the same reference numbers as those shown in FIG. 1, except that a "1" has been added in the hundreds position placing them in the "100" range of reference numbers. Referring to FIG. 2, it will be noted that these elements are elements 110 through 144, corresponding to elements 10 through 44 of FIG. 1. The corresponding elements of FIG. 2 to those of FIG. 1 are similar both in construction and operation. In addition to the elements shown in FIG. 1, FIG. 2 contains elements 202, 204, 206, 210, 212, 214, 216 and switch SW3. The elements 202 and 204 are registers similar to the register 126 (which corresponds to register 26 of FIG. 1). Registers 202 and 204 are for storing the second and third addresses of the three address instructions used in the computer system of FIG. 2.

Associated with the register 202 and 204 are gates 212 and 214. The counter 206 is provided for counting the partial addresses read out from the memory 110. The register 206 has four states of operation and correspondng thereto four output circuits referenced by the symbols R0, R1, R2 and R3. States R1 through R3 of the counter 206 corresponds to the registers 126, 202 and 204, respectively. The counter 206 counts from one state to the next in response to a clock pulse from the clock pulse generator 116 in coincidence with a control signal at the count input thereof. The count input of the register counter 206 is coupled to the BF output of the information register 114. The register counter 206 is arranged in a conventional manner to be reset into a "1" state in response to ground potential at the RES-1 input in coincidence with a clock pulse. A switch SW3 is arranged for applying ground potential to the RES-1 input.

The gates 134, 212 and 214 each have control circuits connected to output of the character counter 138. Also the gates 134, 212 and 214 have inputs connected to the output circuits R1, R2 and R3 of the register counter 206. The gates 134, 212 and 214 are slightly different from the gate 34 of FIG. 1 in that they couple the output of the gate 134 to one of the registers 126, 202 or 204 depending on the state of the register counter 206. Thus, if register 206 is in state "1," gate 134 couples the output of the gate 132 to register 126, if register counter 206 is in state "2," gate 212 couples the gate 132 to register 204. If register counter 206 is in state "3," gate 214 couples the gate 132 to register 204. Similar to gate 34 of FIG. 1, gates 134, 212 and 214 cause the output from the gate 132 to be stored in the storage position of registers 126, 202 and 204 designated by the state of the character counter 138.

The register counter 206 has the R0 output thereof connected to a signal inverter circuit 216 which has an $\overline{R0}$ output. The signal inverter circuit 216 is a conventional circuit well known in the computer art for inverting the signal at the R0 output and for forming a control signal at the $\overline{R0}$ output when no control signal is formed at the R0 output.

An OR gate 210 is provided for applying the control signal to the input of the EFF flip-flop for setting it into a "1" state. The OR gate 210 has its inputs connected to the output of the decoder 130 and to the $\overline{R0}$ output.

Similar to the computer system of FIG. 1, a preferred embodiment of the present invention includes a computer control 141 and a program memory 140. The program memory 140 contains complete addresses which may be used in conjunction with the memory 110. Addresses are transferred between the registers 126, 202 and 204 in the program memory 140 via computer control 141.

Consider now the operation of the computer system of FIG. 2. Initially the switches SW1, SW2 and SW3 are actuated causing the AFF flip-flop to be set into a "1" state, causing the memory timing generator 118 to start a memory cycle, identical to that described with reference to FIG. 1 and causing the register counter 206 to be reset into a "1" state causing a control signal at the R1 output. Similar to that described with reference to register 26 of FIG. 1, the characters are read out of the memory 110, a character at a time from sequential memory locations designated by the memory address register 122. The characters are stored in storage positions C1 through C5 of register 126 until the last character is read out and stored in the information register 114. The operation changes at this point as pointed out hereinafter.

At this point a "1" bit is stored in the BFF flip-flop causing the character counter 138 to be reset to a "0" state and causing a count signal to be applied to the register counter 206. The same clock pulse which causes the character counter 138 to be reset into a "0" state causes the register counter 206 to count from state "1" to state "2." Therefore, at this point, the register counter 206 applies a control signal to the gate 212 causing it to couple the output of the gate 132 to the register 202. Also, the very same clock pulse which resets character counter 138 to a "0" state resets the EFF flip-flop to a "0" state as described in connection with FIG. 1.

At this point the register counter 206 is not in state "0" causing a control signal to be applied to the gate 210 by the $\overline{R0}$ output. Also the same order is contained in the register 124 and the decoder 130 applies a control signal at its output to the gate 210. Therefore, the EFF flip-flop is caused to be set into a "1" state again causing the computer system to start its memory cycles over again.

Similar to that described for register 126, the characters for the second address are read out of the memory 110, character by character, the counter 138 counts the characters causing the gate 212 to store each character read from the memory 110 into the storage position C1 through C5 of register 202 corresponding to the state of the character counter 138. When the last character of the second partial address is read out and stored in the information register 114 another control signal is formed at the BF output. The following clock pulse causes the last address character to be stored into he storage position of the register 202 corresponding to the state of the character counter 138 and as described hereinabove, the following clock pulse counts the register 206 up to state "3," resets the character counter 138 to state "0" and resets the EFF flip-flop to a "0" state.

Since the register counter 206 is in state "3" and not state "0," a control signal is again formed at the $\overline{R0}$ output indicating another address is to be read. This causes the gate 210 to apply another control signal to the EFF flip-flop resetting it into a "1" state and causing the partial address characters of the third address to be read out and stored into register 204 through the gate 214. This operation continues as described hereinabove for each character of the third address until the last character of the partial address is read out and stored in the information register 114. At this point, a control signal is formed at the BF output again and at the following clock pulse the last partial address register is stored into the storage position of the register 204 corresponding to the state of the character counter 138, the register counter 206 is counted into the state "0." With the register counter 206 in state "0" the operation of the computer system of FIG. 2 terminates.

In summary, the register counter 206 counts the partial addresses read out of the memory 110 and the gates 134, 212 and 214 store the partial address characters into the register designated by the register counter 206. The register counter 206 counts the characters within each partial address and the gates 134, 212 and 214 store the partial address characters into the storage position of the registers corresponding to the state of the character counter 138.

The foregoing description is given by way of example. Other arrangements of the present invention may be devised within the scope of the invention as defined in the accompanying claims.

What is claimed:

1. In a digital computer having multiple variable length addresses, the combination comprising a plurality of register means each having a predetermined number of character storage positions therein arranged in a predetermined order for storing a complete address therein, memory means for storing and reading out addresses representing complete and partial addresses which are represented by a series of characters, the partial addresses having less characters than a complete address and the last character of a partial address having a unique signal identifying the same, first counting means for counting the address characters read from the memory means and for providing an indication of the position in a register means into which each address character is to be stored, gating means for storing each address character read from the memory means into the position of the register means indicated by said first counting means, means for monitoring the address characters read from the memory means and for causing the first counting means to be reset to an initial condition upon detection of said unique signal in an end address character, and second counting means for providing a count corresponding to each of said register means responsive to said unique signal in an end address character for causing said second counting means to count to the next register means, said gating means additionally being coupled to said second counting means for causing the address characters read from the memory means to be stored into the correct register means as designated by the second counting means.

2. In a digital computer having multiple variable length addresses, the combination comprising a plurality of register means each having a predetermined number of characters storage positions therein arranged in a predetermined order for storing a complete address therein, memory means for storing and reading out addresses at least some of which are partial addresses which are represented by a series of characters, the partial addresses having less characters than a complete address and the last character of a partial address having a unique signal identifying the same, means for providing an indication of the position in a register means into which each different address character is to be stored as each is read from the memory means, gating means for storing each address character read from the memory means into the position of one of the register means indicated by said indicating means, means for monitoring the address characters read from the memory means and for providing an end of address signal upon detection of said unique signal in an end address character, and multiple state means responsive to said end of address signal for providing a unique signal corresponding to each of said register means as the corresponding address is read from the memory means, said gating means additionally being coupled to said multiple state means for causing the address characters read from the memory means to be stored into the correct register means as designated by the multiple state means.

3. In a digital computer having multiple variable length addresses, the combination comprising a plurality of register means each having a predetermined number of character storage positions therein arranged in a predetermined order for storing a complete address therein, memory means for storing and reading out addresses at least some of which are partial addresses which are represented by a series of characters, the partial addresses having less characters than a complete address, means for providing an indication of the position in a register means into which each different address character is to be stored as each is read from the memory means, gating means for storing each address character read from the memory means into the position of the register means indicated by said indicating means, and multiple state means for providing a unique signal corresponding to each of said register means as the corresponding address is read from the memory means, said gating means additionally being coupled to said multiple state means for causing the address characters read from the memory means to be stored into the correct register means as designated by the multiple state means.

4. In a digital computer as defined in claim 3 wherein said addresses are contained in instructions and there are three addresses in each instruction, said register means comprising three registers.

References Cited

UNITED STATES PATENTS

| | | | |
|---|---|---|---|
| 3,061,192 | 10/1962 | Terzian | 340—172.5 X |
| 3,077,580 | 2/1963 | Underwood | 340—172.5 |
| 3,223,982 | 12/1965 | Sacerdoti et al. | 340—172.5 |
| 3,303,477 | 2/1967 | Voigt | 340—172.5 |
| 3,311,893 | 3/1967 | Landell | 340—172.5 |

P. J. HENON, *Primary Examiner.*

UNITED STATES PATENT OFFICE

CERTIFICATE OF CORRECTION

Patent No. 3,359,542 December 19, 1967

Charles E. Macon et al.

It is hereby certified that error appears in the above numbered patent requiring correction and that the said Letters Patent should read as corrected below.

Column 3, line 65, after "register" insert -- 24 --; line 73, for "out" read -- output --; column 4, line 12, after "character" insert -- counter --; column 6, lines 57 and 59, for "RES-1", each occurrence, read -- RES=1 --; column 7, line 66, for "he" read -- the --.

Signed and sealed this 21st day of January 1969.

;EAL)

ttest:

dward M. Fletcher, Jr.

ttesting Officer

EDWARD J. BRENNER

Commissioner of Patents